(12) United States Patent
Lapczynski et al.

(10) Patent No.: US 11,195,010 B2
(45) Date of Patent: Dec. 7, 2021

(54) SMOKE DETECTION SYSTEM AND METHOD

(71) Applicant: Smoked sp. z o. o., Bialystok (PL)

(72) Inventors: Rafal Lapczynski, Zabki (PL); Pawel Konieczny, Julianów (PL); Artur Matuszczak, Józefoslaw (PL)

(73) Assignee: Smoked sp. z o. o., Bialystok (PL)

( * ) Notice: Subject to any disclaimer, the term of this patent is extended or adjusted under 35 U.S.C. 154(b) by 118 days.

(21) Appl. No.: 16/420,716

(22) Filed: May 23, 2019

(65) Prior Publication Data

US 2019/0362126 A1 Nov. 28, 2019

Related U.S. Application Data

(60) Provisional application No. 62/675,253, filed on May 23, 2018.

(51) Int. Cl.
| | |
|---|---|
| *G06K 9/00* | (2006.01) |
| *H04L 29/08* | (2006.01) |
| *G08B 17/10* | (2006.01) |
| *G06K 9/62* | (2006.01) |
| *G06T 9/00* | (2006.01) |
| *H04N 5/225* | (2006.01) |
| *H04N 5/33* | (2006.01) |

(52) U.S. Cl.
CPC ......... *G06K 9/0063* (2013.01); *G06K 9/6262* (2013.01); *G06T 9/00* (2013.01); *G08B 17/10* (2013.01); *H04L 67/06* (2013.01); *H04N 5/2253* (2013.01); *H04N 5/33* (2013.01)

(58) Field of Classification Search
None
See application file for complete search history.

(56) References Cited

U.S. PATENT DOCUMENTS

| | | | | |
|---|---|---|---|---|
| 10,137,984 | B1* | 11/2018 | Flick | G08G 5/006 |
| 2006/0248028 | A1* | 11/2006 | Tedesco | G06K 9/00624 |
| | | | | 706/14 |
| 2011/0297828 | A1* | 12/2011 | Weisbach | H04N 5/35581 |
| | | | | 250/330 |
| 2017/0053169 | A1* | 2/2017 | Cuban | H04N 7/185 |
| 2018/0239982 | A1* | 8/2018 | Rutschman | H04N 5/23299 |

(Continued)

OTHER PUBLICATIONS

FireWatch—Early Detection of Forest Fires for Large Areas, https://www.iq-wireless.com/en/firewatch, accessed May 13, 2019.

(Continued)

*Primary Examiner* — Wei Wen Yang
(74) *Attorney, Agent, or Firm* — McKee, Voorhees & Sease, PLC

(57) ABSTRACT

A method of detecting smoke or a fire involves the installation of properly produced cameras in the field. The cameras send recorded photos to a server. A computer downloads the photos from the server and uses attempts to automatically detect smoke with artificial intelligence software. Photos with a detected fire are sent to users which interface with a non-transitory computer readable medium, such as a desktop computer or a mobile phone, capable of executing a software application for verification. Verified smoke or fire threats signal alarms to the designated fire department in an effort to prevent fires from spreading and thus causing unnecessary damage to communities, lives, and ecosystems.

20 Claims, 16 Drawing Sheets

(56) References Cited

U.S. PATENT DOCUMENTS

2019/0340433 A1* 11/2019 Frank .................. G06T 7/70
2020/0054905 A1* 2/2020 Livchak ............... G08B 17/107

OTHER PUBLICATIONS

Brochure, "Forest Watch, Wildfire Detection and Monitoring Systems", EnviroVision Solutions USA, 2 sided, dated Jun. 30, 2018.
Insight Robotics Wildfire Detection System, https://www.insightrobotics.com, accessed May 23, 2019.

* cited by examiner

STAGE 6

SMOKE DETECTION SYSTEM AND METHOD

CROSS REFERENCE TO RELATED APPLICATIONS

This application claims priority under 35 U.S.C. § 119 to provisional patent application U.S. Ser. No. 62/675,253, filed May 23, 2018. The provisional patent application is herein incorporated by reference in its entirety, including without limitation, the specification, claims, and abstract, as well as any figures, tables, appendices, or drawings thereof.

FIELD OF THE INVENTION

The present disclosure relates generally to an improved smoke detection system and an improved method for detecting smoke and/or fires.

BACKGROUND OF THE INVENTION

The background description provided herein is for the purpose of generally presenting the context of the present disclosure. Work of the presently named inventors, to the extent the work is described in the present disclosure, as well as aspects of the description that may not otherwise qualify as prior art at the time of filing, are neither expressly nor impliedly admitted as prior art.

Every year, more than 60,000 forest fires are brewed in the United States which burn down more than 5,000 homes. In order to prevent forest fires from burning down more homes, it is necessary to provide earlier detection of fires, thereby enabling quick reactions of fire departments, services, or brigades to contain and suppress these fires. Currently, classic methods of fire detection based on video monitoring do not ensure quick detection of a threat. Over 90% of fires are reported to a dispatcher of the fire department, service, or brigade on average within 1.5 hours of its creation.

Previous methods of dealing with fire detection were based on video monitoring using rotating cameras from which the image is sent to the observation center. In the center there is an operator (dispatcher) who constantly monitors the image of the cameras. This method is possible to use in a limited scope, because such an observer may observe images with a maximum of 5 cameras. However, as the number of cameras increases, inefficiencies are created which result in the increased risk of not detecting an emerging fire. For example, rotating cameras (PTZ) have a small viewing angle and when set in a position only cover a range of about 50-60 degrees. This traditional method of dire detection also requires the installation of advanced infrastructure, a high bandwidth link between the camera and the observation center, and the employment of an appropriate number of operators or observers.

Thus, there exists a need in the art for an improved smoke detection system and a method for detecting smoke or fires within a few minutes of their creation such that fire departments, services, or brigades are notified almost immediately after a fire occurs.

BRIEF SUMMARY OF THE INVENTION

Therefore, it is a primary object, feature, or advantage of the present invention to improve on or overcome the deficiencies in the art.

It is still yet a further object, feature, or advantage of the present invention to analyze, with smoke detection software, photographs by comparing the pixel values of similar images.

It is still yet a further object, feature, or advantage of the present invention to install high-speed cameras capable of sending recorded photos from the cameras to a server, to use artificial intelligence to automatically detect smoke from a fire, to send recorded photos with a detected fire to a mobile application for verification by the community, and to send verified alarms to the appropriate fire department, service, or brigade for containing or suppressing the detected fire.

It is still yet a further object, feature, or advantage of the present invention to allow users of the artificial intelligence to detect and verify threats and still remain independent of the complex technical infrastructure in the field.

It is still yet a further object, feature, or advantage of the present invention to improve the range of cameras utilized within the smoke detection system.

It is still yet a further object, feature, or advantage of the present invention to use internet protocol cameras which overcome the hurdle associated with a network bandwidth limiting the number of cameras that can be on the network without overloading it.

It is still yet a further object, feature, or advantage of the present invention to provide a smoke detection system that is usable in a wide variety of environments.

It is still yet a further object, feature, or advantage of the present invention to provide a smoke detection system that improves the safety of people, wildlife, and homes.

It is still yet a further object, feature, or advantage of the present invention to provide a smoke detection system that aids in reducing pollution.

It is still yet a further object, feature, or advantage of the present invention to provide a smoke detection system that is cost effective.

It is still yet a further object, feature, or advantage of the present invention to provide a smoke detection system that is reliable and durable.

It is still yet a further object, feature, or advantage of the present invention to provide a smoke detection system that can be easily manufactured, installed, repaired, and disassembled.

It is still yet a further object, feature, or advantage of the present invention to provide a smoke detection system that is aesthetically pleasing.

It is still yet a further object, feature, or advantage of the present invention to provide methods of using, manufacturing, installing, or servicing cameras or smoke detection systems accomplishing some or all of the previously stated objectives.

The previous list of objects, features, or advantages of the present invention are not exhaustive and do not limit the overall disclosure. Likewise, the following list of aspects or embodiments do not limit the overall disclosure. It is contemplated that any of the objects, features, advantages, aspects, or embodiments disclosed herein can be integrated with one another, either in full or in part, as would be understood from reading the present disclosure.

According to some aspects of the present disclosure, a smoke detection system comprises a camera. The camera comprises an infrared camera module periodically taking photos of a landscape; to determine a geographic position of objects identified within the landscape, (i) a GPS receiver and (ii) a gyroscope, a magnetometer, or an accelerometer; a light intensity sensor; an operable connection to the Internet; and a processor that (i) downloads stored data which includes the photos through the operable connection to the Internet and (ii) executes an algorithm comparing characteristic values of the photos based on a pixel matrix. The smoke detection system further comprises artificial intelligence to compare results obtained from executing the algorithm with other data from an open-source software library, a non-transitory computer readable medium capable of executing a software application allowing users to verify potential smoke or fire related threats identified by the artificial intelligence, and a means for notifying a fire department, service, or brigade of verified smoke or fire related threats.

According to some additional aspects of the present disclosure, the camera is installed in an elevated area.

According to some additional aspects of the present disclosure, the camera is mounted on a drone.

According to some additional aspects of the present disclosure, the smoke detection system further comprises a File Transfer Protocol (FTP) server to control image capture.

According to some additional aspects of the present disclosure, the photos are compressed with a lossless compression into compressed images and further wherein the stored data comprises the photos.

According to some additional aspects of the present disclosure, the artificial intelligence references a deep learning library to continuously improve the ability to recognize smoke.

According to some additional aspects of the present disclosure, the means for notifying a fire department, service, or brigade is a notification forming part of a mobile application or a web application, an email, a short messaging service (SMS), or a multi-media messaging service (MMS).

According to some additional aspects of the present disclosure, the smoke or fire related threats are deemed verified if, after polling the users, more users indicate there is smoke or a fire than users who do not indicate there is smoke or a fire, and further wherein a verified smoke or fire related threat results in the means for notifying a fire department, service, or brigade transmitting an alarm to the fire department, service, or brigade.

According to some additional aspects of the present disclosure, the alarm transmitted to the fire department, service, or brigade includes a photo of the verified smoke or fire related threat, a map with a calculated position of the camera from the GPS receiver, and statistics including how many and what percentage of users verified the smoke or fire related threat.

According to some additional aspects of the present disclosure, the camera further comprises a wide-angle lens.

According to some other aspects of the present disclosure, a method of detecting smoke or a fire comprises installing a camera in an elevated area. The camera comprises an infrared camera module periodically taking photos of a landscape; to determine a geographic position of objects identified within the landscape, (i) a GPS receiver and (ii) a gyroscope, a magnetometer, or an accelerometer; a light intensity sensor; an operable connection to the Internet; and a processor that (i) downloads stored data which includes the photos through the operable connection to the Internet and (ii) executes an algorithm comparing characteristic values of the photos based on a pixel matrix. The method further comprises with the processor, downloading stored data which includes the photos through the operable connection to the Internet; executing an algorithm comparing characteristic values of the photos based on a pixel matrix; with artificial intelligence, comparing results obtained from executing the algorithm with other data from an open-source software library; and verifying smoke or fire related threats identified by the artificial intelligence.

According to some additional aspects of the present disclosure, the method further comprises compressing the photos with a lossless compression into compressed images.

According to some additional aspects of the present disclosure, the method further comprises referencing a deep learning library to continuously improve the ability to recognize smoke.

According to some additional aspects of the present disclosure, the method further comprises reducing bandwidth required by the camera by transferring control of image capture from an FTP server to the camera.

According to some additional aspects of the present disclosure, the method further comprises notifying a fire department, service, or brigade of verified smoke or fire related threats via a mobile application or a web application, an email, a short messaging service (SMS), or a multi-media messaging service (MMS).

According to some additional aspects of the present disclosure, users perform the verifying step, at least in part, with a non-transitory computer readable medium capable of executing a software application.

According to some additional aspects of the present disclosure, verifying smokes or fire related threats occurs if, after polling the users, more users indicate there is smoke or a fire than users who do not indicate there is smoke or a fire.

According to some additional aspects of the present disclosure, notifying the fire department, service, or brigade includes sending a photo of the verified smoke or fire related threat, a map with a calculated position of the camera from the GPS receiver, and statistics including how many and what percentage of users verified the smoke or fire related threat.

According to some additional aspects of the present disclosure, the method further comprises triangulating the location of smoke or a fire via the use of more than one camera.

According to some other aspects of the present disclosure, a camera specially adapted for use in a smoke detection system comprises a wide-angle lens; an infrared camera module periodically taking photos of a landscape; to determine a geographic position of objects identified within the landscape, (i) a GPS receiver and (ii) a gyroscope, a magnetometer, or an accelerometer; a light intensity sensor; an operable connection to the Internet; and a processor that (i) downloads stored data which includes the photos through the operable connection to the Internet and (ii) executes an algorithm comparing characteristic values of the photos based on a pixel matrix.

According to some other aspects of the present disclosure, a software application, such as a mobile application or a web application, allows users to verify potential smoke or fire related threats identified by the artificial intelligence. In the event of a verified smoke or fire related threat, the software application can automatically notify a fire department, service, or brigade with a photo of the verified smoke or fire related threat, a map with a calculated position of the camera from the GPS receiver, and statistics including how many and what percentage of users verified the smoke or fire related threat.

These or other objects, features, and advantages of the present invention will be apparent to those skilled in the art after reviewing the following detailed description of the illustrated embodiments, accompanied by the attached drawings.

BRIEF DESCRIPTION OF THE DRAWINGS

FIG. 8 shows an image, a map, and a wildfire position which identify the location of a verified smoke or fire related threat, according to some aspects of the present disclosure.

Figure 1:
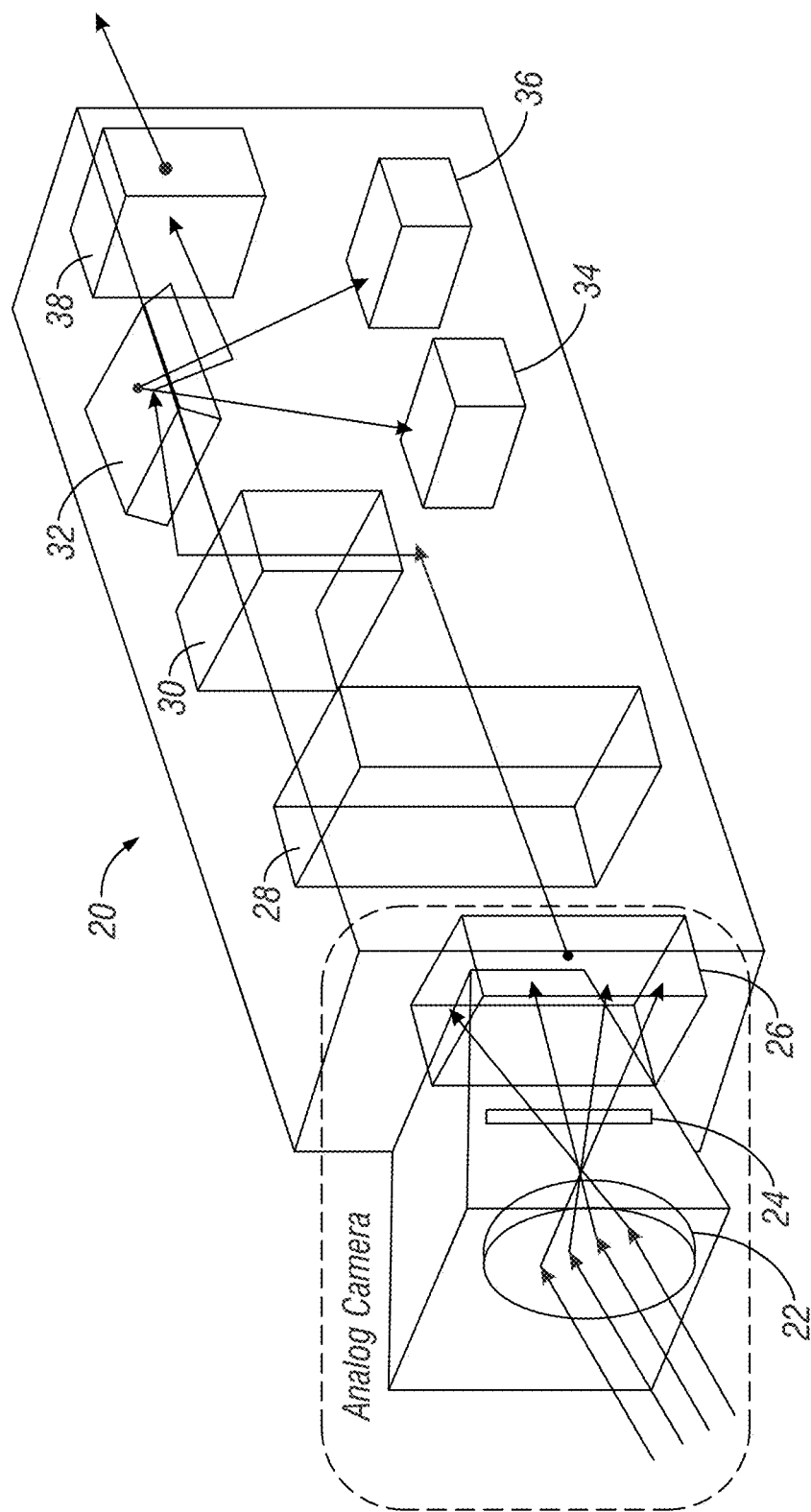
FIG. 1 shows an illustrative diagram of an exemplary internet protocol camera, according to some aspects of the present disclosure.

Various embodiments of the present disclosure illustrate several ways in which the present invention may be practiced. These embodiments will be described in detail with reference to the drawings, wherein like reference numerals represent like parts throughout the several views. Reference to specific embodiments does not limit the scope of the present disclosure and the drawings represented herein are presented for exemplary purposes.

DETAILED DESCRIPTION

Definitions—Introductory Matters

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms "a," "an," and "the" include plural referents unless context clearly indicates otherwise. Similarly, the word "or" is synonymous with "and/or" and is intended to include "and" unless context clearly indicate otherwise. The word "or" means any one member of a particular list and also includes any combination of members of that list.

The terms "invention" or "present invention" as used herein are not intended to refer to any single embodiment of the particular invention but encompass all possible embodiments as described in the specification and the claims.

The term "about" as used herein refers to variation in the numerical quantities that can occur, for example, through typical measuring techniques and equipment, with respect to any quantifiable variable, including, but not limited to, mass, volume, time, distance, angle, wave length, frequency, voltage, current, and electromagnetic field. Furthermore, there is certain inadvertent error and variation that is likely through differences in the manufacture, source, or purity of the components used to make or carry out the present invention. The claims include equivalents to the quantities whether or not modified by the term "about."

The term "configured" describes an apparatus, system, or other structure that is constructed to perform or capable of performing a particular task or to adopt a particular configuration. The term "configured" can be used interchangeably with other similar phrases such as constructed, arranged, adapted, manufactured, and the like.

The terms "user" and "reporter" as used herein are person(s) capable of crowdsourcing information related to smoke and/or fire related threats. The devices, modules, and software applications discussed in the present disclosure typically provide means for both reporting smoke and/or fire related threats.

In communications and computing, a computer readable medium is a medium capable of storing data in a format readable by a mechanical device. The term "non-transitory" is used herein to refer to computer readable media (CRM) that store data for short periods or in the presence of power such as a memory device or random-access memory (RAM).

Terms such as first, second, vertical, horizontal, top, bottom, upper, lower, front, rear, end, sides, concave, convex, and the like, are referenced according to the views presented. These terms are used only for purposes of description and are not limiting unless these terms are expressly included in the claims. Orientation of an object or a combination of objects may change without departing from the scope of the invention.

The apparatuses, systems, and methods of the present invention may comprise, consist essentially of, or consist of the components of the present invention described herein. The term "consisting essentially of" means that the apparatuses, systems, and methods may include additional components or steps, but only if the additional components or steps do not materially alter the basic and novel characteristics of the claimed apparatuses, systems, and methods.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

As used herein, an analog camera is essentially a subassembly within an internet protocol (IP) camera. Analog cameras generally consist of four main components, a conventional lens with its holder, an image sensor, and a digital signal processor (DSP).

The types of image sensors utilized in IP cameras are complementary metal-oxide semiconductor (CMOS) image sensors and charge-coupled device (CCD) image sensors. CCD image sensors have uniform output and thus a better image quality, while CMOS image sensors have a less uniform output and thus a worse image quality. As a result, CMOS image sensors tend to be cheaper than CCD image sensors and are more commonly used in IP cameras. It is not uncommon for IP camera manufacturers to use the same CMOS image sensors used by mobile phone manufacturers.

The DSP is essentially the brain of the camera. The DSP converts raw analog image data taken in from the image sensor. DSPs may allow for digital noise reduction and wide dynamic range for the camera. The quality of the image heavily deteriorates as the image is transmitted over coaxial cable after being converted back to analog. Every time data is encoded/decoded, data bits are lost and cause less image clarity. The DSP is used to enhance video image quality at night, in color and other common industry requirements, and is not necessary to obtain video output from the camera.

It is important for purposes of the present disclosure to make a careful distinction between the technology contained within IP cameras and within webcams. Webcams are essentially just image sensors which capture a raw video file and transmit the data through USB cables. A software application running on the computer and not the CPU of the camera utilizes the computer to encode the analog input into digital. IP cameras, on the other hand have their own CPU and components necessary to do the encoding, decoding, apply algorithms, etc. IP cameras also have their own web server and have the capacity to stream video independently from a computer. Similar to a computer, memory components and a CPU exist within an IP camera to handle video and image compression, web server firmware, de-interlace preprocessing, noise filtering, etc.

Overview

The following embodiments are described in sufficient detail to enable those skilled in the art to practice the invention however other embodiments may be utilized. Mechanical, procedural, and other changes may be made without departing from the spirit and scope of the invention. Accordingly, the scope of the invention is defined only by the appended claims, along with the full scope of equivalents to which such claims are entitled.

As shown in FIG. 1, a simple internet protocol (IP) camera 20 is provided. Exemplary components of such an IP camera 20 include a conventional lens 22, optical component 24, camera module 26, video audio codec 28, external device controller 30, computer processing unit (CPU) 32, flash memory 34, memory 36, and network interface 38.

The video audio codec 28 above takes a video or image data file and digitally compresses it using a specific type of compression algorithm. Some IP cameras have multiple streaming capabilities, where the video codec will compress each data file input to multiple video files such as H.264, MPEG4, or MJPEG at the same time or multiple image files such as JPEG/JFIF, GIF, BMP, or PNG at the same time. In analog cameras, the DSP encodes the analog signal to digital signal without compressing the video or image file.

Digital videos and images are streamed through the network, processed at the computer, and stored digitally. Video and images remain digital and no unnecessary conversions are made resulting in superior image quality. IP cameras provide many beneficial features such as compressing videos and images to minimize video and image streaming over the network. IP cameras utilize frame rate control technology. Frame rate control technology sends images at a specified frame rate; thus, only necessary frames are sent.

Previous methods dealing with fire detection are based on video monitoring using rotating cameras (PTZ) from which the image is sent to the observation center. In the center there is an operator (dispatcher) who constantly monitors the image of the cameras. This method is possible to use in a limited scope, because such an observer is able to observe images with a maximum of 5 cameras. As the number of cameras increase, inefficiencies are created which increase the risk of not detecting an emerging fire. The use of this traditional method requires the installation of advanced infrastructure, a high bandwidth link between the camera and the observation center, and the employment of an appropriate number of operators/observers. Furthermore, these methods are inefficient solution because rotating cameras (PTZ) have a small viewing angle. Set in one position, they cover only a range of about fifty to sixty degrees. Additionally, existing cameras used for observation are not equipped with a mechanism to determine the location of smoke or a fire.

An improvement of the methods described above is the use of smoke detection software from photographs that are based on comparing the pixel values of similar images and significantly reduces bandwidth required (from about 25 Mb to 0.5 Mb) by the camera by transferring control of image capture from an FTP server to the camera. The smoke and fire detection method disclosed in the present application involves the installation of properly placed cameras specially adapted for use in a smoke detection system in the field, sending recorded photos from cameras to the server, automatic smoke detection using artificial intelligence, sending photos with a detected fire to the mobile application for verification by the community, and sending verified alarms to the appropriate fire department, service, or brigade. The above method includes the use of artificial intelligence and the community to detect and verify threats and make the user independent of the complex technical infrastructure in the field.

Figure 2:
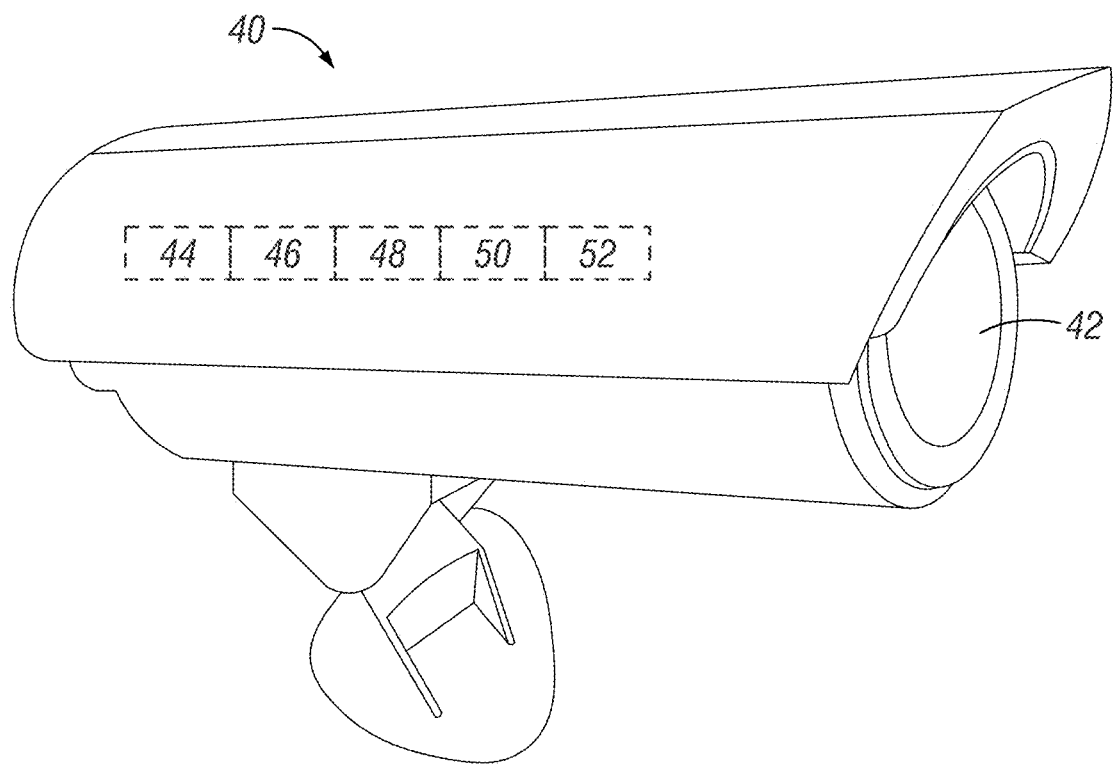
FIG. 2 shows a camera specially adapted for use in a smoke detection system, according to some aspects of the present disclosure.

As shown in FIG. 2, an improved internet protocol camera 40 comprises a wide-angle lens 42, a microprocessor 44, a GPS 46, a compass 48, a gyroscope, an accelerometer, and/or a magnetometer 50, and/or a light intensity sensor 52. The improved IP camera 40 is specially adapted for use in a smoke detection system and is typically installed in an elevated area, such as a roof, chimney, tower, on a hill or a mountain, etc.

Installation of the improved IP camera 40 requires only operably connecting the cable with the Internet 74, as the rest of the configuration is done automatically. This is different from how cameras known in the art are controlled and configured from the outside and sent single photos or video to the control center. The operable connection to the Internet may be accomplished wirelessly or via an ethernet capable.

IP cameras are connected on either a local area network ("LAN") or a wide area network ("WAN") through a router and are not connected directly to a digital video recorder for surveillance recording. A computer or a standalone NVR on the same network can then pick up the video streaming through the network and use that digital stream to record it digitally on the hard drive.

The present disclosure also contemplates the network can be a neighborhood area network ("NAN"), a home area network ("HAN"), or personal area network ("PAN") employing any of a variety of communications protocols, such as Wi-Fi, Bluetooth, ZigBee, near field communication ("NFC"), etc., although other types of networks are possible and are contemplated herein. Communications through the network by the camera can be protected using one or more encryption techniques, such as those techniques provided in the IEEE 802.1 standard for port-based network security, pre-shared key, Extensible Authentication Protocol ("EAP"), Wired Equivalency Privacy ("WEP"), Temporal Key Integrity Protocol ("TKIP"), Wi-Fi Protected Access ("WPA"), and the like.

The improved IP camera and components thereof may be powered in a number of ways. It is contemplated that the system be hard-wired, cord and plug connected, or otherwise powered, such as to AC power plugs and sockets. A hard-wired IP camera is one where the building wiring method attaches to the camera in a more permanent fashion. This will involve splicing of wires inside the appliance or in a junction box. Cord and plug connected appliances have a cord with a molded plug that is either factory or field installed on the camera. The camera is then ready to be plugged into a receptacle in the location it is permanently installed. The hard-wired power source could be on a power grid, or could be a separate generator, battery, or other source. The wire could provide Power over Ethernet (PoE) or via USB cable, such as if the system is connected in such a manner. Still further, it is contemplated that the system be self-powered or include on-board power, in that there is no wiring to a separate power source. Such a configuration could include batteries in the camera, such as non-rechargeable (e.g., dry battery) or rechargeable (e.g., Lithium-ion) type batteries. Still further, other types of power, such as, but not limited to, solar, piezoelectric sources, and the like, which can provide additional amounts of power.

The smoke and fire detection system of the present application utilizes cameras with a wide angle of observation (100 degrees), which allows for observation of a greater range of the horizon and a high-resolution camera module (8 MPx), the image details are not lost. Analysis of photos taken by the use of a wide-angle lens 42 (100 degrees) at the left and right edges is limited by about 5 degrees on both sides. This can cause the whole picture to not be analyzed, which means that the effective horizontal angle used for analysis may be 90 degrees. Additionally, the smoke and fire detection system is equipped with an automatic smoke detection mechanism, which limits the role of a dispatcher or operator (if one is even still used) in a control center to only the assessment of the correctness of the generated reports, thereby increasing the area covered by the observation. The use of several cameras within a single smoke or fire detection system allows for triangulating the location of smoke or a fire.

The combination of data from the sensors of the smoke and fire detection system with the numerical model or algorithm of the smoke and fire detection system allow the system to determine the location of a fire in order to quickly extinguish it.

Figure 3:
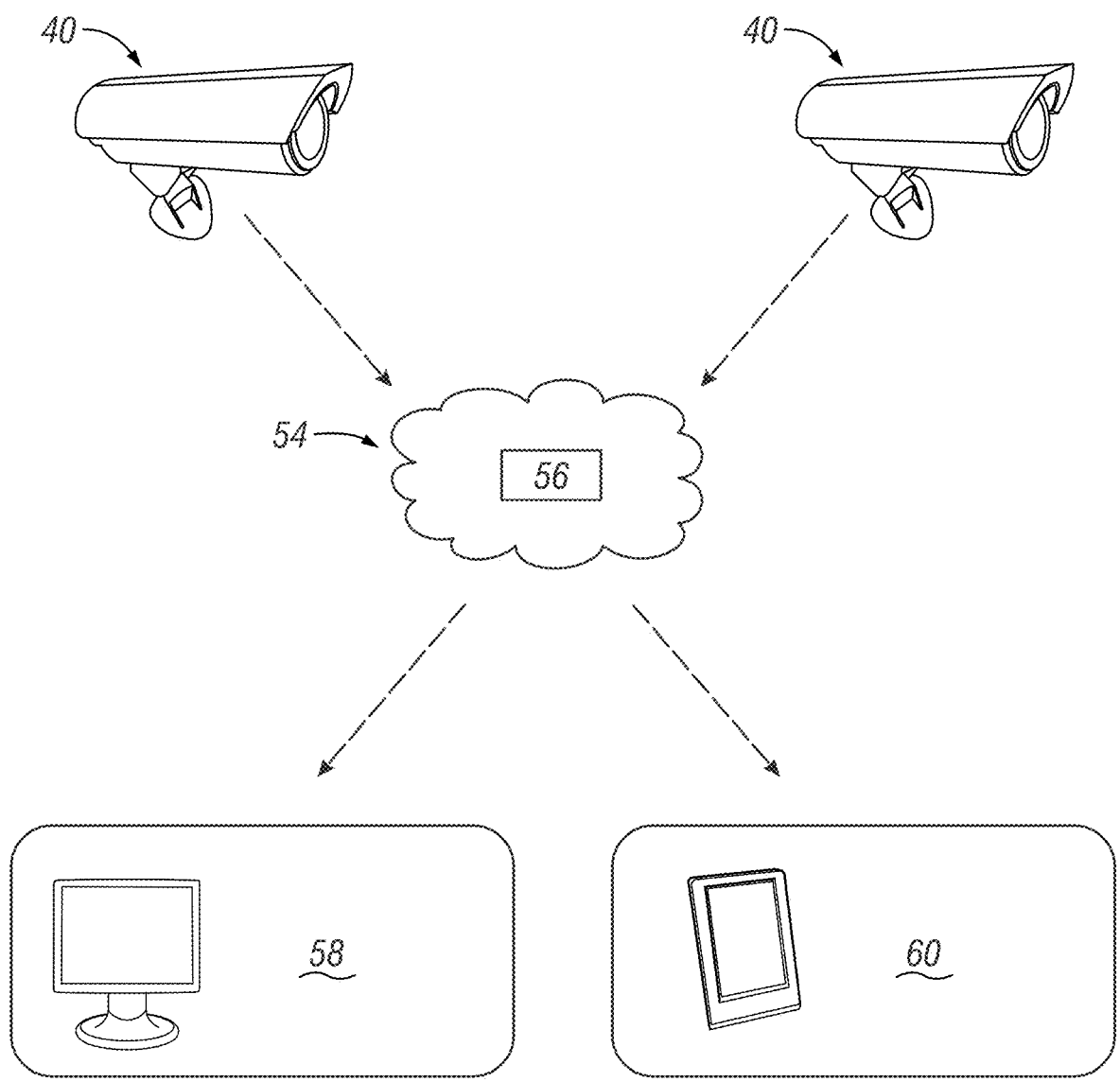
FIG. 3 shows a schematic of an exemplary smoke detection system, according to some aspects of the present disclosure.
Figure 4:
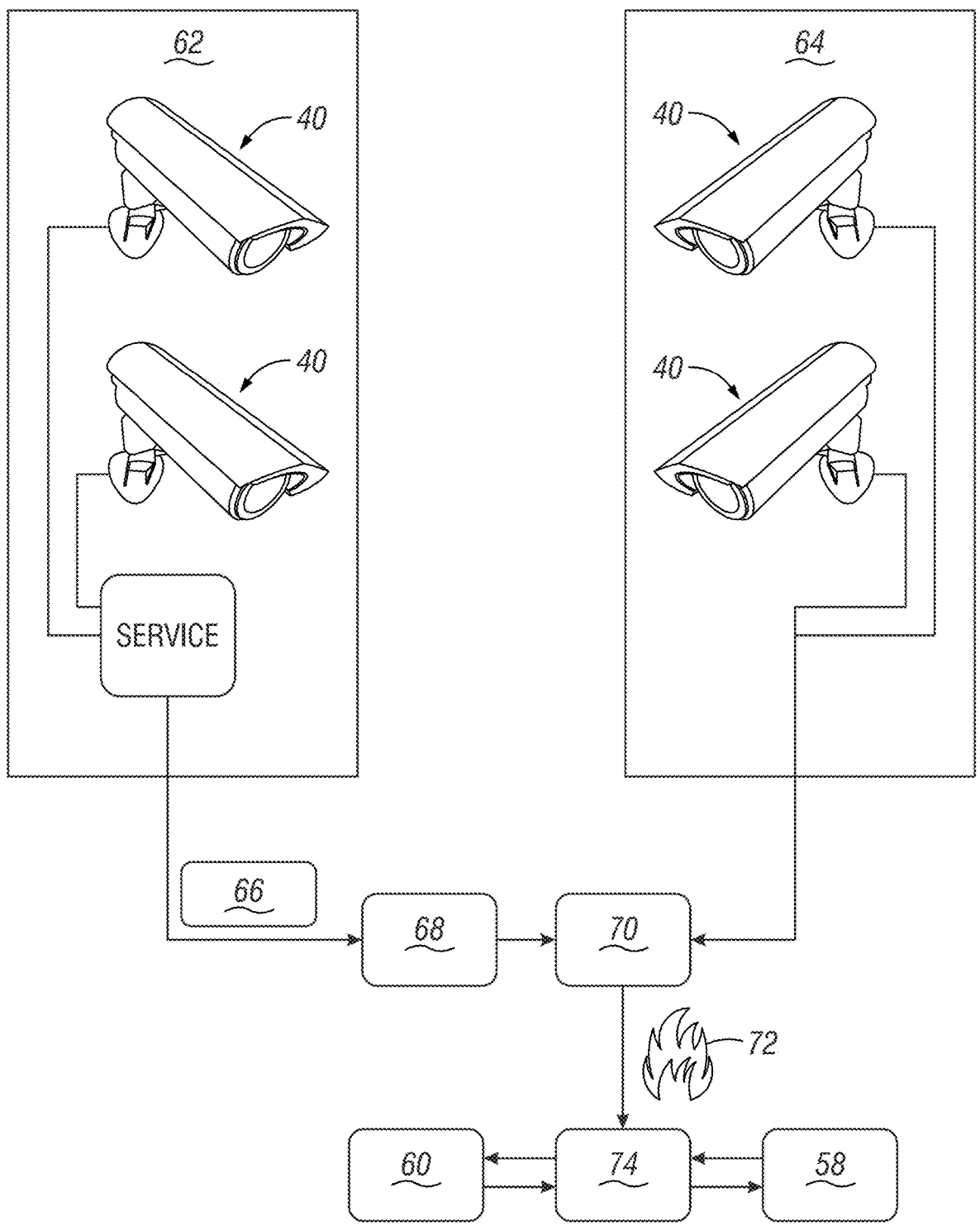
FIG. 4 shows another schematic of an exemplary smoke detection system, according to some aspects of the present disclosure.

As is shown in FIGS. 3 and 4, internal programming of the microprocessor 44 controls the rate at which photos are taken (e.g., the camera 40 may take 5 photos every 3 seconds each and repeats this procedure in cycles every 2 minutes). Photos are compressed with lossless compression. Compressed images 66 and data from other sensors are sent to the FTP server 68. The smoke detection server 70 downloads data from the FTP server 68 and performs data analysis in a cloud using an algorithm 54. The algorithm 54 looks for differences between individual photos based on a pixel matrix. The values of the same pixels are compared from each photo. It is beneficial for the algorithm 54 to control the execution of images in an appropriate sequence.

Figure 5:
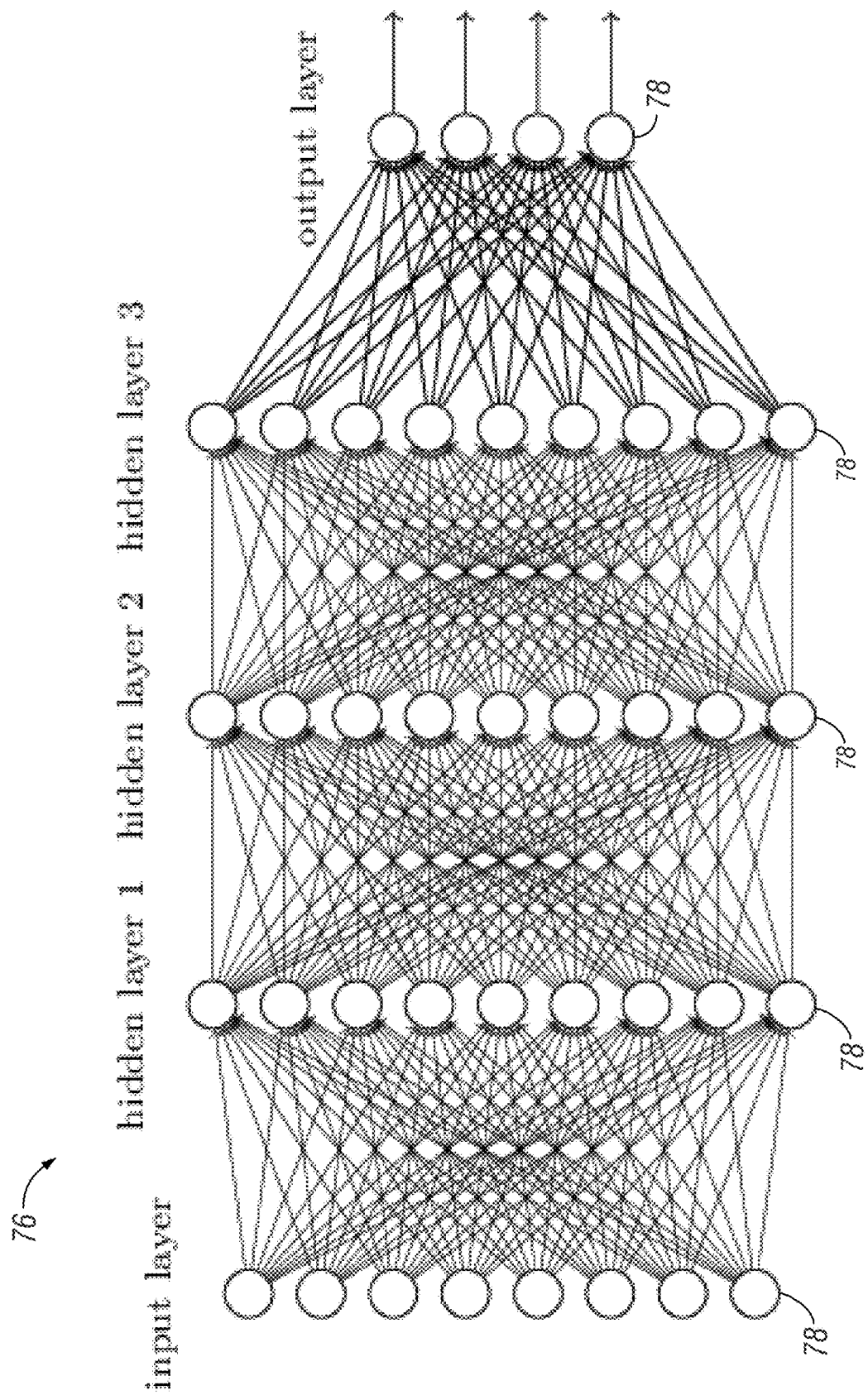
FIG. 5 shows layers of an exemplary neural network of a deep learning library, according to some aspects of the present disclosure.
Figure 6A:
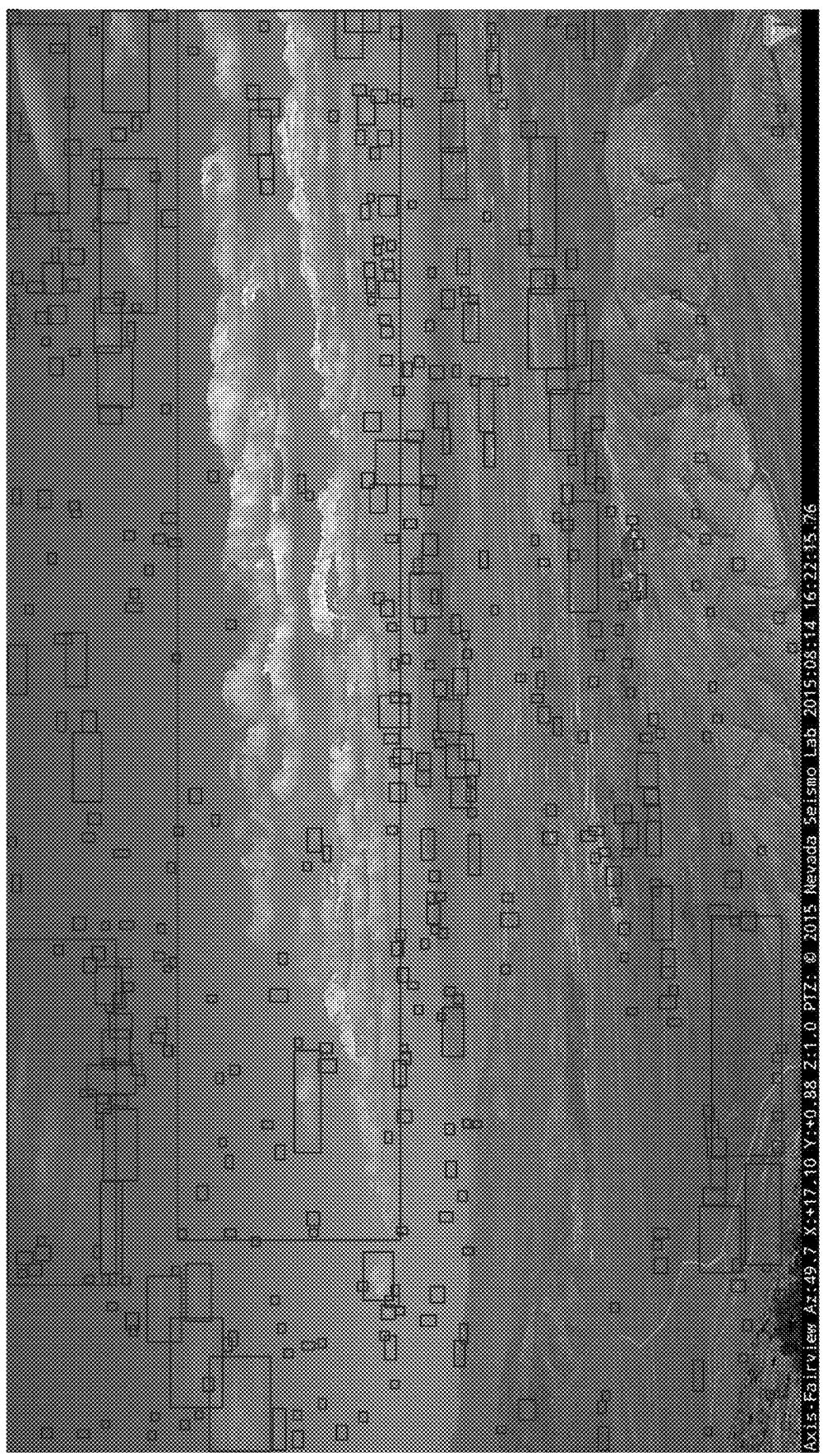
FIGS. 6A-6H show, chronologically, stages in which artificial intelligence interprets results obtained from the data analysis, according to some aspects of the present disclosure.
Figure 6B:
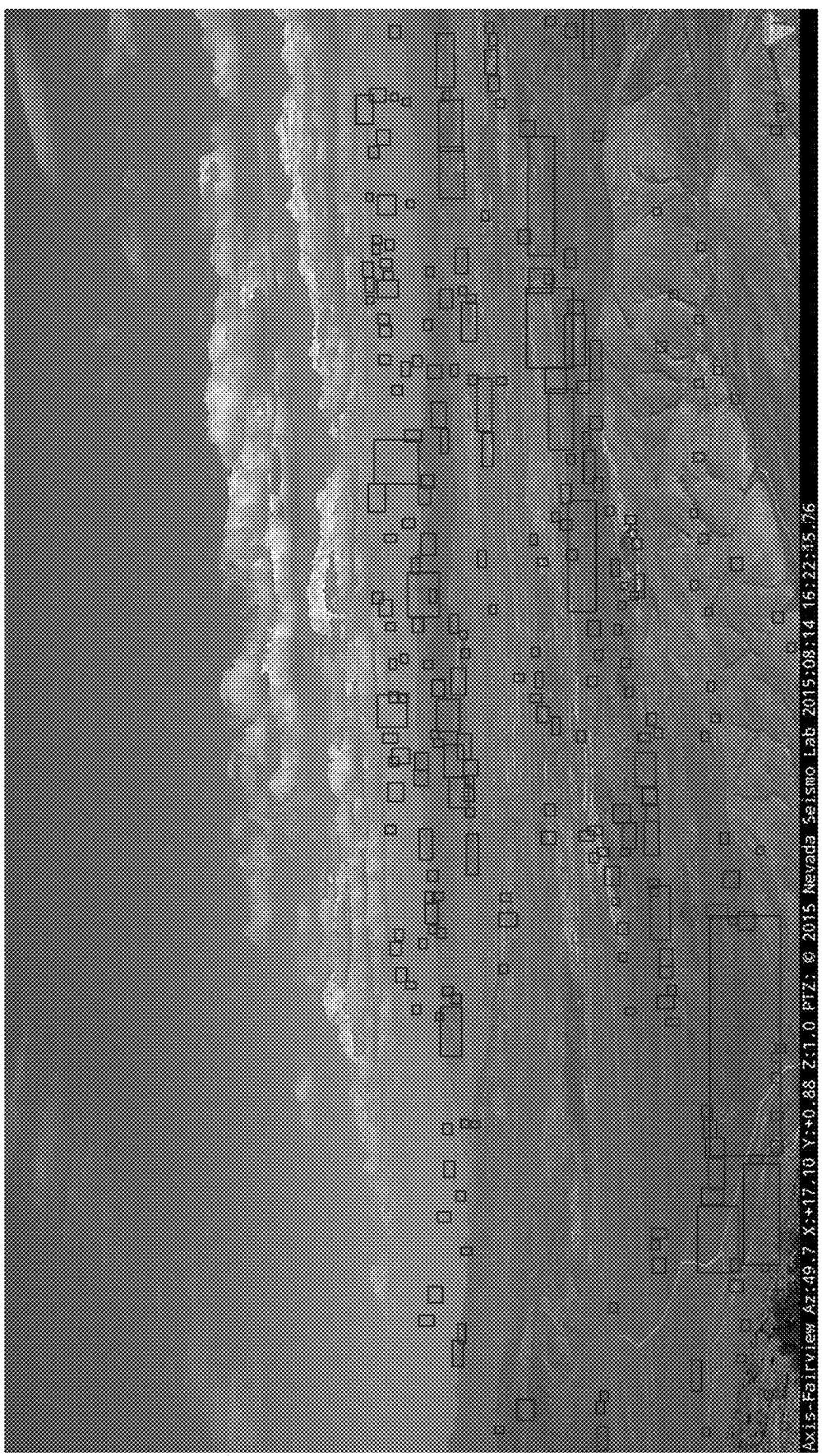
Figure 6C:
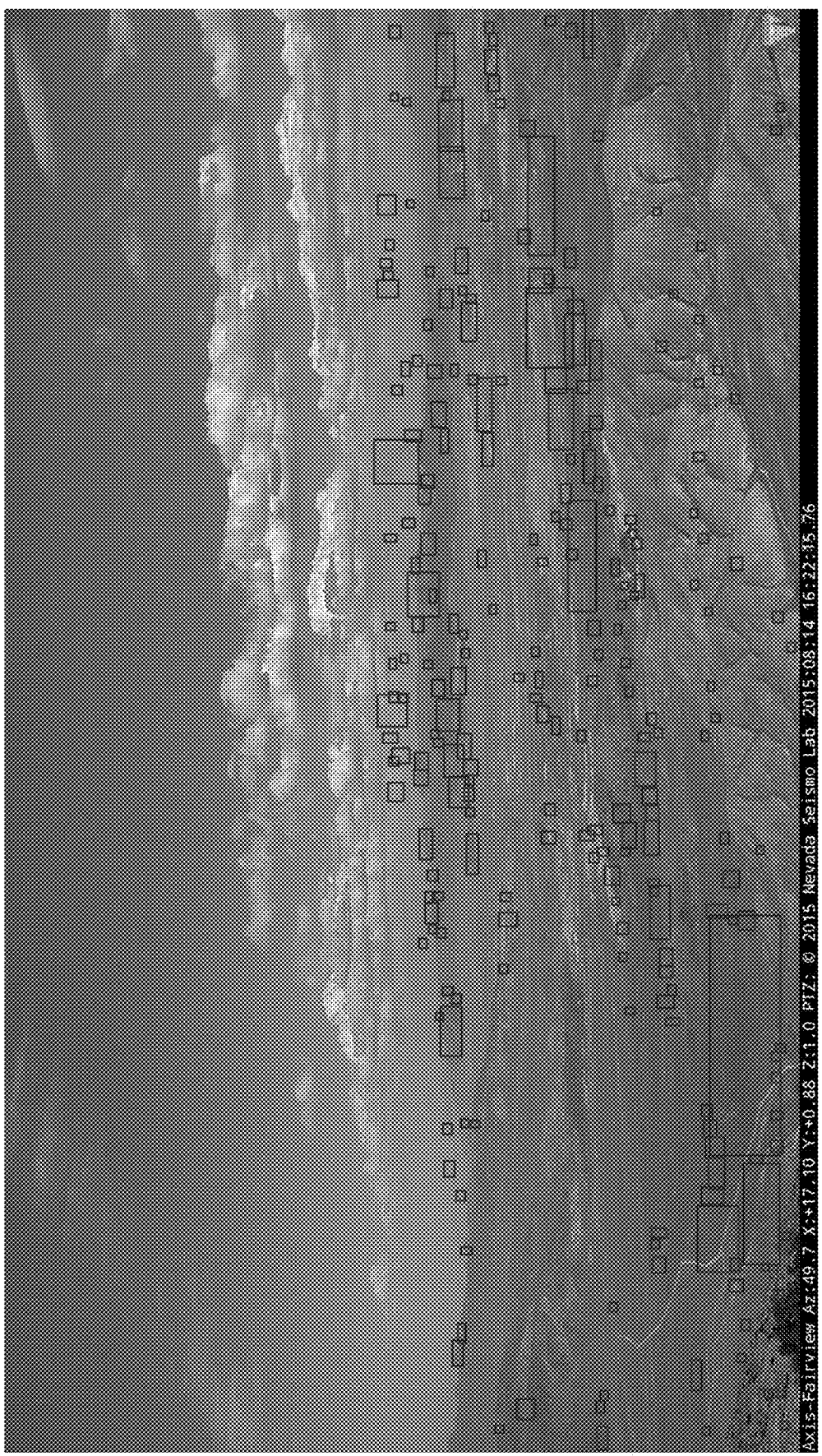
Figure 6D:
Figure 6E:
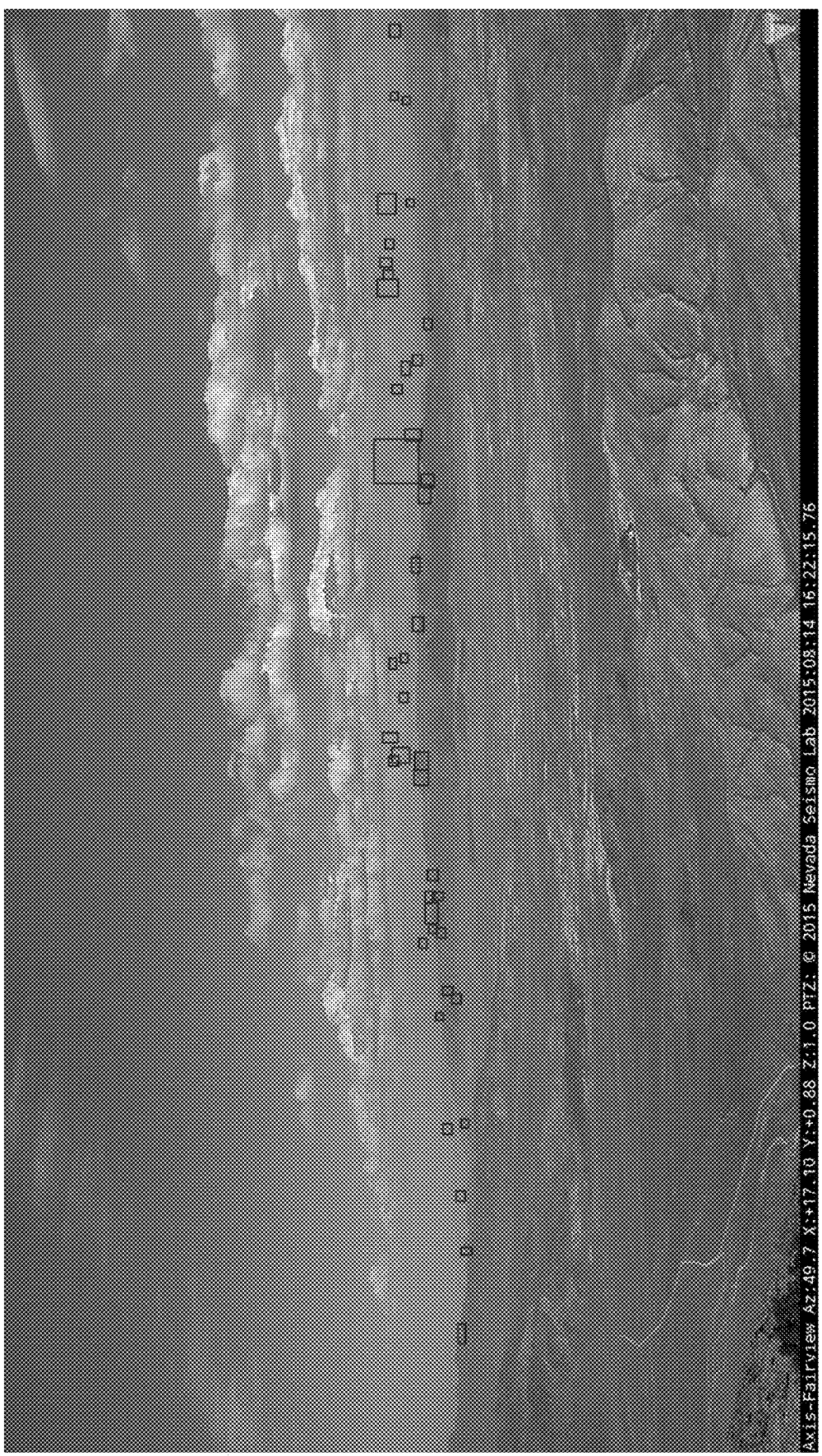
Figure 6F:
Figure 6G:
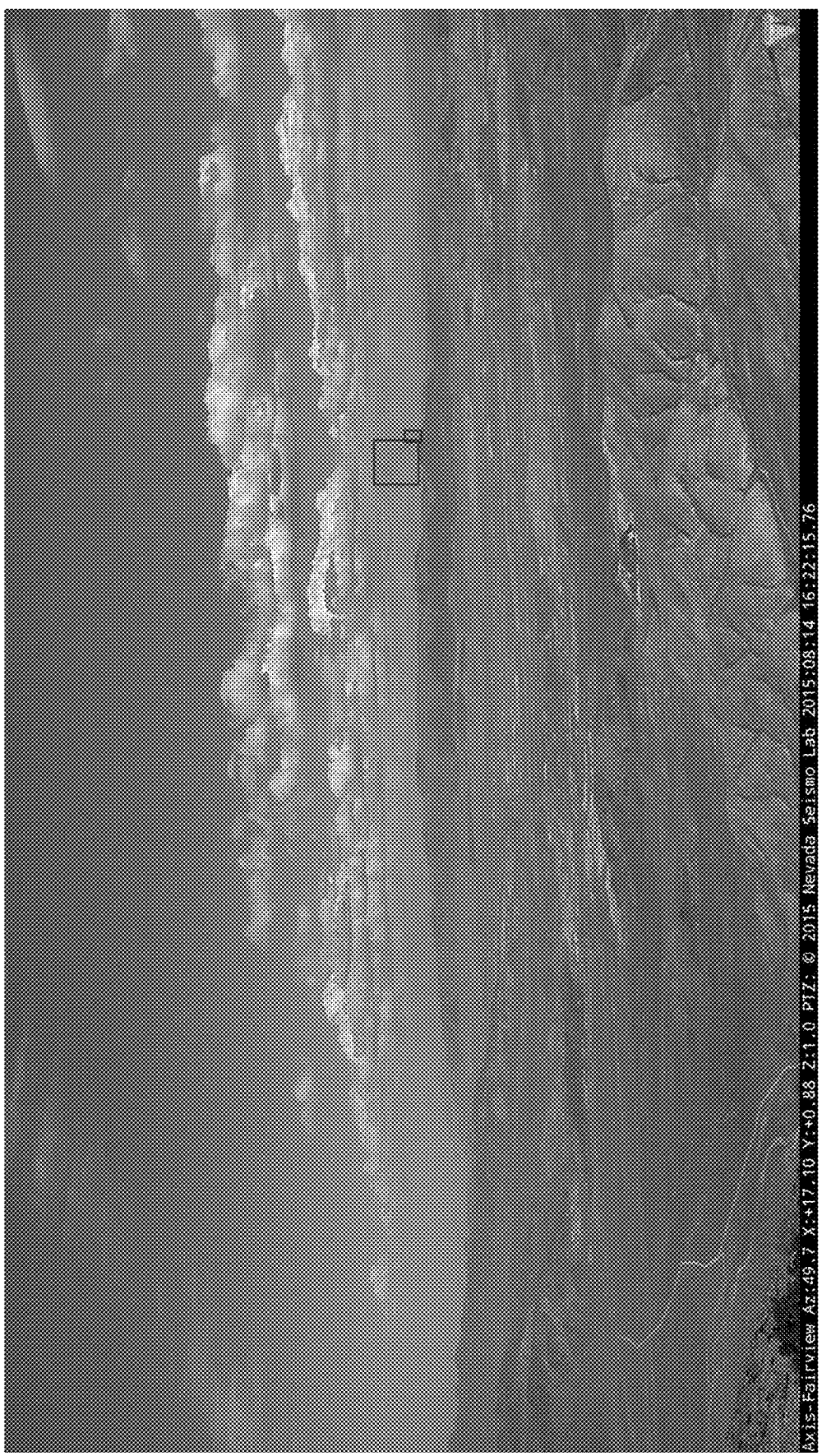
Figure 6H:
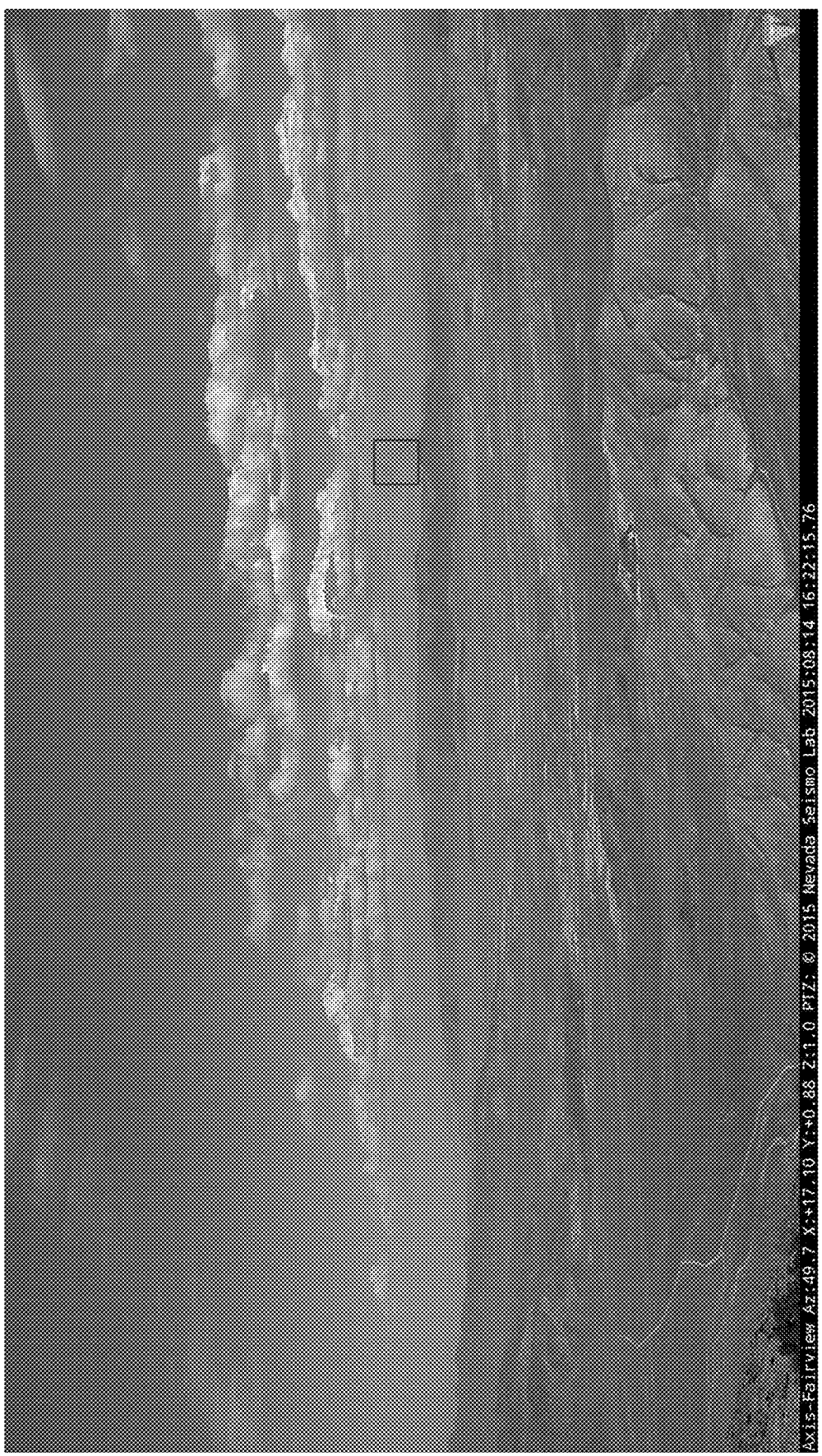

As shown in FIG. 5, building the model of the artificial intelligence 56 may take place on the components of an open-source software library for dataflow programming across a range of tasks, such as Google TensorFlow, and an open source neural network library (deep-learning library) 76, such as Keras (written in Python). Such a configuration allows the artificial intelligence 56 to reference the deep learning library 76 to continuously improve the ability to recognize smoke from each improved IP camera 40 within the smoke and fire detection system.

The model is based on the concept of convolutional neuron network. The purpose of the model is to determine the probability of occurrence of smoke on an image (photo), as well as its location. The model on entry receives a sequence of three photos (RGB) made at short intervals and the model generates on the exit a monochromatic (single duct) image with resolution of input photos, where the brightness scale determines whether in a given area there is smoke (a heat map is created, higher probability is shown by brighter area).

The model comprises the following elements: an encoder (resnet18)—a deep neuron network trained on a great collection of images in order to recognise their features (recognition of shapes, edges, lines, etc.); a decoder to restore an image to its original size—after the reduction, information is recovered about the location of areas to facilitate precisely indicating the location of fire; and a classifier to generate the output image and determine a probability of representing smoke for each pixel.

Due to the great number of layers 78 in the deep neuron network model, training the deepest layers 78 requires a great amount of time and data. Model variables during the training process propagate on a constantly slower rate for subsequent deep network layers 78. Therefore, already trained models are typically used.

The algorithm 54 and the artificial intelligence 56 work together. After analyzing the photos using an algorithmic method (e.g. executing algorithm 54), the results are used in the artificial intelligence 56—thereby reducing false alarms and making the results more reliable.

FIGS. 6A-6H show intermediate stages in which the artificial intelligence 56 interprets results obtained from the data analysis performed by the microprocessor 54 of the camera 40 in relation to the open-source software library 76.

The reliance on the infrared camera module allows the smoke or fire detection system to differentiate between potential smoke (which is hot) and objects that only look like smoke, such as clouds. The squares in the photos represent potential smoke or fire related threats 72. A sequence of photos comprises at least three photos. The photos comprising natural colors, such as colors according to the RGB color model (red, green, blue). Photos in a single sequence represent the same area. While photos can be moved in relation to other photos, only the mutual area common to all of the photos will be analyzed. Delay between making specific photos in a sequence ranges between 1 and 60 seconds.

Potential smoke or fire related threats 72 are systematically eliminated in a sequence of at least three photos. Elimination is caused by the combination of the algorithm 54 and artificial intelligence 56 in an effort to identify an image with identified smoke or fire related threats 84. An infrared filter may be applied to each of the photos in a sequence to help identify fire and smoke related threats 84.

Figure 7:
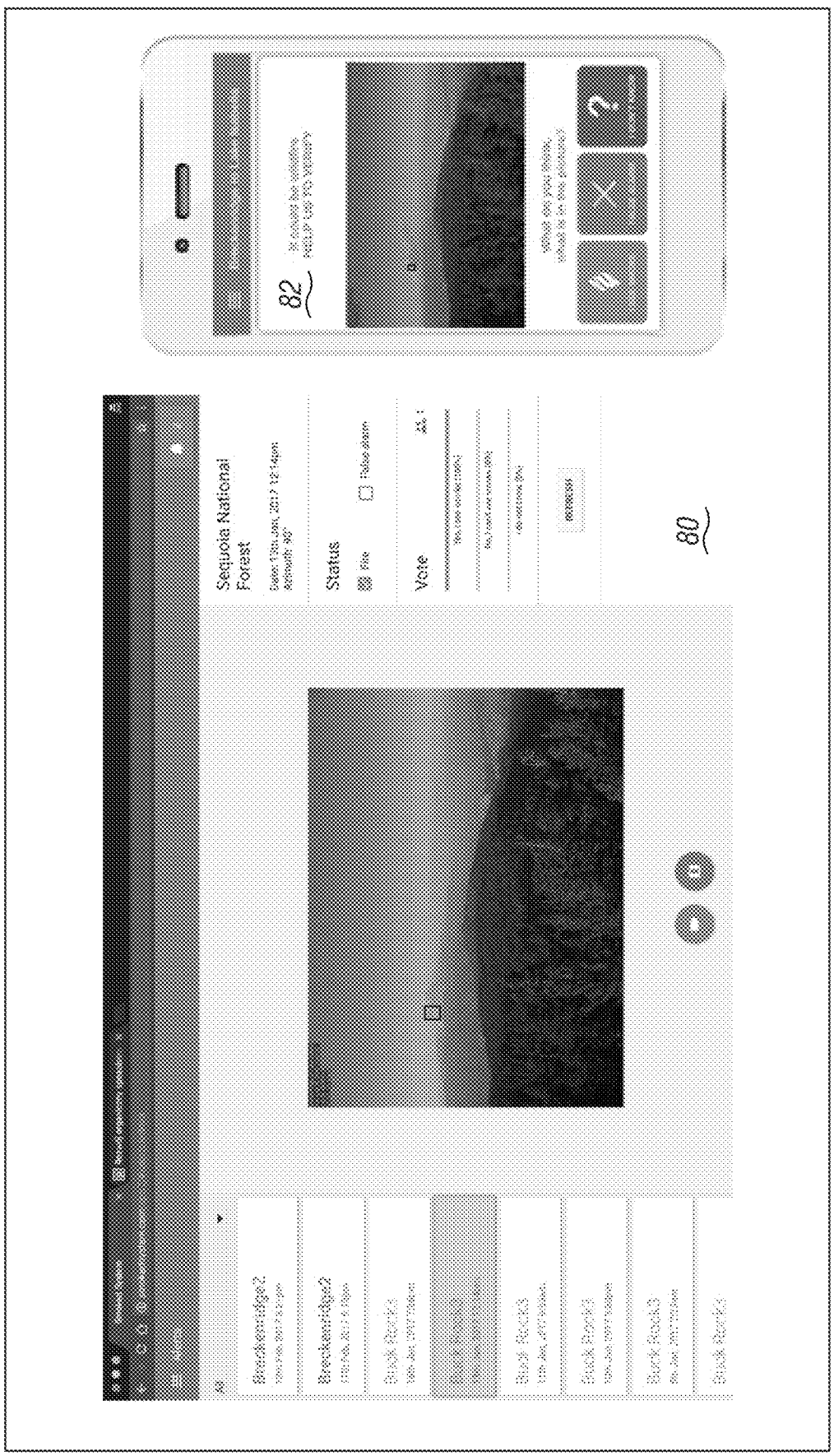
FIG. 7 shows exemplary graphical user interfaces for a web application and a mobile application utilized in a smoke detection system, according to some aspects of the present disclosure.
Figure 8:
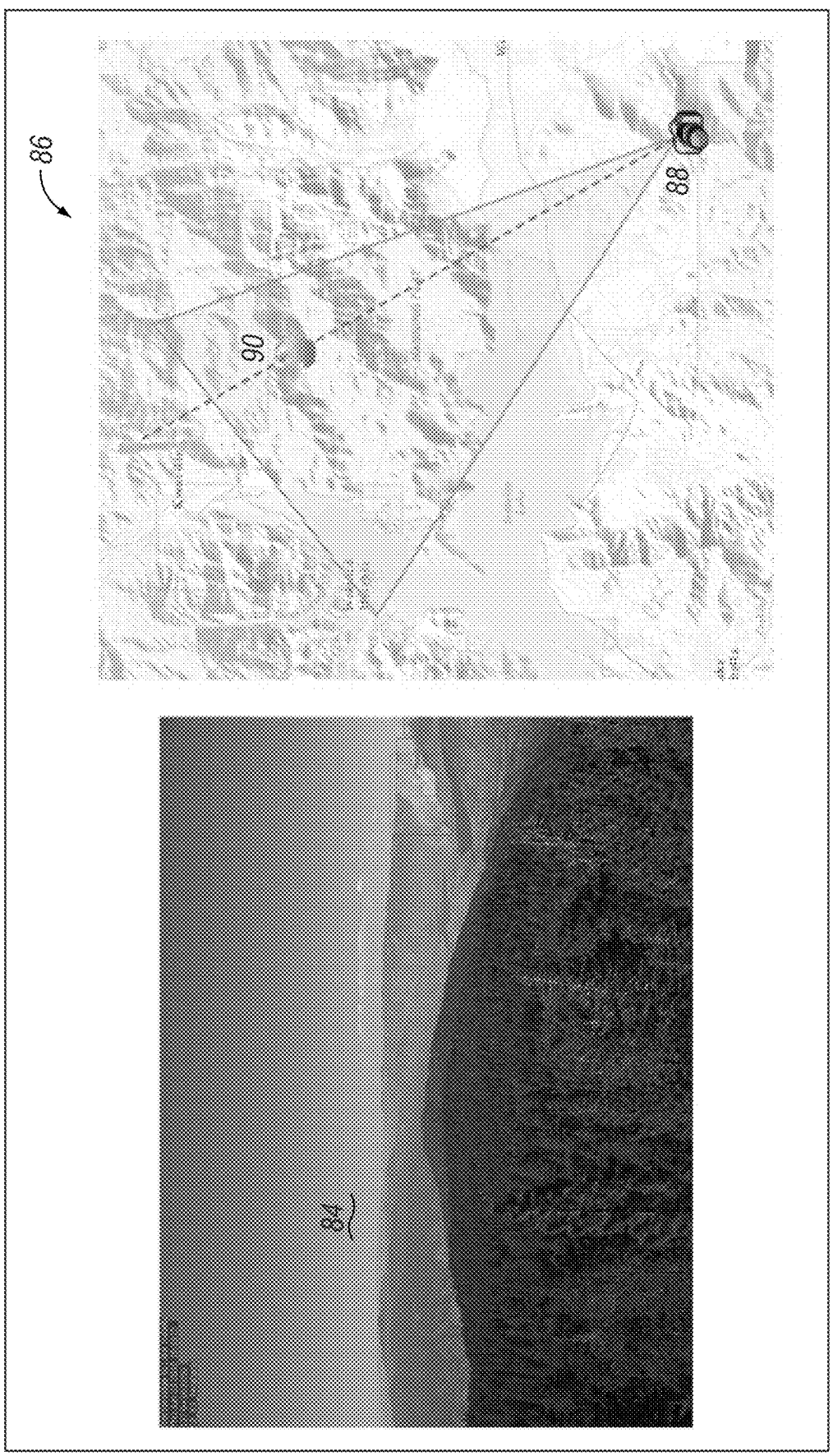
FIG. 8 shows the contents of an alert; more particularly

As in shown in FIGS. 7 and 8, each notification from the system is verified by the dispatcher or the community which means the smoke and fire detection system is constantly powered by data for learning.

Verification of notifications from the smoke and detection system may take place through a mobile application 60 or web application 58 loaded onto a non-transitory computer readable medium. The mobile application 60 is preferably made available to the public at large, at potentially no cost. This form of crowdsourcing from the community is novel within smoke and fire detection systems and allows for 24 hour, 7 day a week monitoring of potential wildfires. In the event of wildfires, the smoke and fire detection system disclosed in the present application also facilitates more quickly notifying the public, as some members of the public will already be engaged in the detection process. It is believed the present disclosure will help reduce the time to detect fire and smoke from 1.5 hours to 10 minutes.

The non-transitory computer readable medium in which the mobile application 60 or web application 58 is tied to may include components such as an intelligent control and communication components. Examples of such intelligent control units may be central processing units alone or in tablets, telephones, handheld devices, laptops, user displays, or generally any other computing device capable of allowing input, providing options, and showing output of electronic functions. Still further examples include a microprocessor, a microcontroller, or another suitable programmable device and a memory. The controller also can include other components and can be implemented partially or entirely on a semiconductor (e.g., a field-programmable gate array ("FPGA")) chip, such as a chip developed through a register transfer level ("RTL") design process.

The memory includes, in some embodiments, a program storage area and a data storage area. The program storage area and the data storage area can include combinations of different types of memory, such as read-only memory ("ROM", an example of non-volatile memory, meaning it does not lose data when it is not connected to a power source) or random access memory ("RAM", an example of volatile memory, meaning it will lose its data when not connected to a power source). Some additional examples of volatile memory include static RAM ("SRAM"), dynamic RAM ("DRAM"), synchronous DRAM ("SDRAM"), etc. Additional examples of non-volatile memory include electrically erasable programmable read only memory ("EEPROM"), flash memory, a hard disk, an SD card, etc. In some embodiments, the processing unit, such as a processor, a microprocessor, or a microcontroller, is connected to the memory and executes software instructions that are capable of being stored in a RAM of the memory (e.g., during execution), a ROM of the memory (e.g., on a generally permanent basis), or another non-transitory computer readable medium such as another memory or a disc.

Generally, the non-transitory computer readable medium operates under control of an operating system stored in the memory. The non-transitory computer readable medium also implements a compiler which allows a software application written in a programming language such as COBOL, C++, FORTRAN, or any other known programming language to be translated into code readable by the central processing unit. After completion, the software application accesses and manipulates data stored in the memory of the non-transitory computer readable medium using the relationships and logic that was generated using the compiler.

In one embodiment, instructions implementing the operating system, a software application, and the compiler are tangibly embodied in the computer-readable medium, which could include one or more fixed or removable data storage devices, such as a zip drive, floppy disc drive, hard drive, CD-ROM drive, tape drive, etc. Furthermore, the operating system and the software application are comprised of instructions which, when read and executed by the non-transitory computer readable medium, causes the non-transitory computer readable medium to perform the steps necessary to implement and/or use the present invention. A software application and/or operating instructions may also be tangibly embodied in memory and/or data communications devices, thereby making the software application a product or article of manufacture according to the present invention.

A potential smoke or fire related threat 72 may be verified if more than 50% of responding users of the web application 58 or mobile application 60 verify the notification from the system as real smoke or a fire within 5 minutes of reporting. At this point, the system would automatically notify the fire department, service, or brigade (via mobile application, email, SMS).

The smoke or fire detection system sends alarms to the fire department, service, or brigade which include a photo with identified smoke or fire related threat 84, a map 86 with the calculated position of the camera 88 (in part based on an output from the GPS 46) and wildfire 90, and the results, i.e. statistics, of voting by the community.

Figure 9:
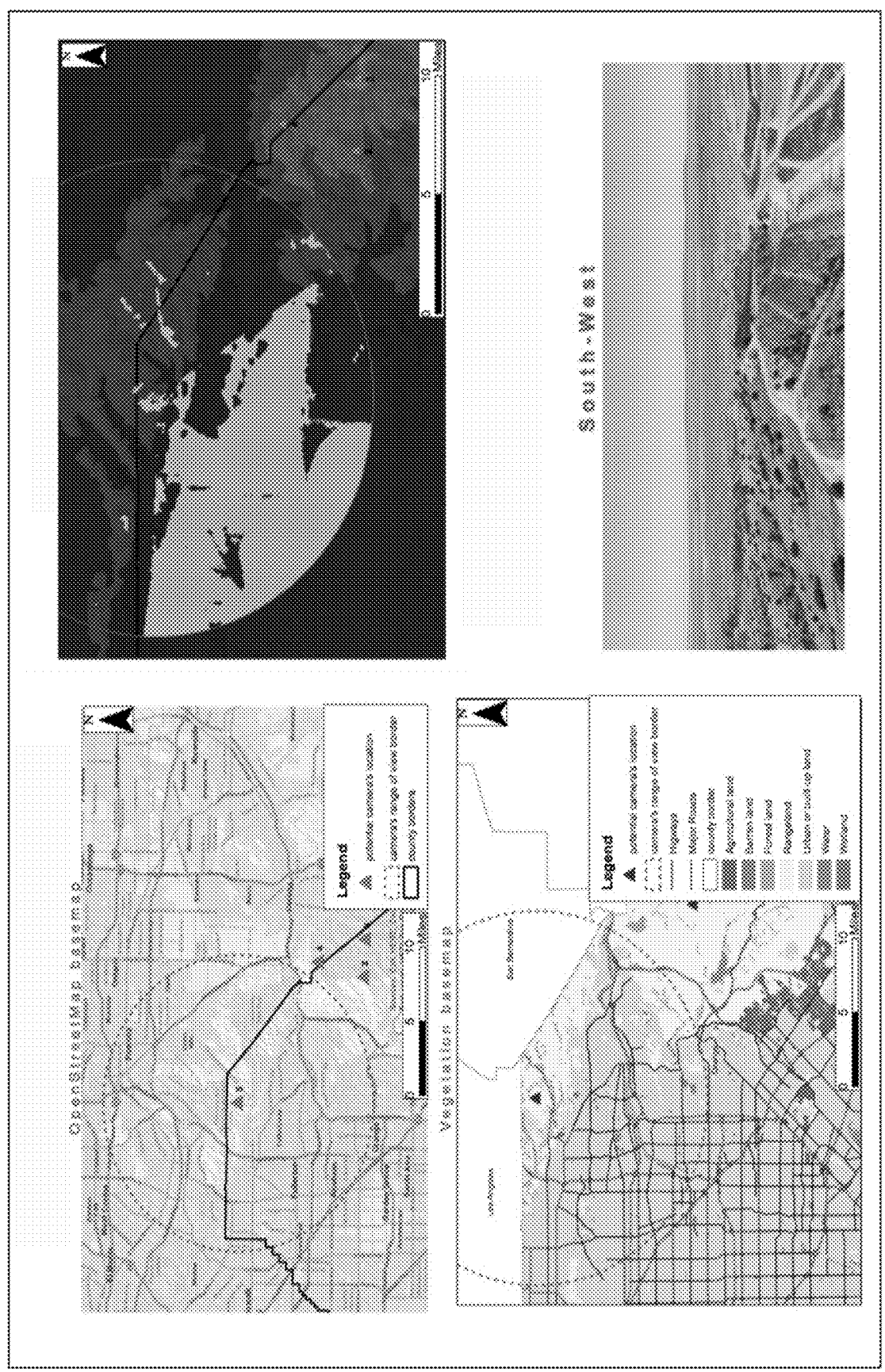
FIG. 9 shows an example of GIS analysis before installation of a camera, according to some aspects of the present disclosure.

FIG. 9 shows an example of GIS analysis before installation of a camera. More particularly, the range view border of potential camera installation (in this example: Orange County, Calif.) for an OpenStreetMap base map and a vegetation base map is shown and includes symbols which denote potential camera locations, a camera's range of view border, county borders, highways, major roads, agricultural land, barren land, forest land, rangeland, urban or built-up land, water, and wetland. The results of the visibility analysis and estimated views from cameras in this example are also shown.

The smoke and fire detection system disclosed herein is particularly useful for monitoring large areas (forests, fields, plantations, urban areas, industrial facilities, etc.) because of which users will obtain information about the appearance of smoke or flames in the area covered by the improved IP camera 40 view. A single improved IP camera 40 can typically detect wildfires for up to 10 miles.

Algorithm Example

According to one aspect of the invention, the algorithm 54 can comprise executing any one or more of the following steps:

a) calibrating the analyzed sequence (S1)—e.g., determining a mutual area covered by all photos by moving and turning subsequent photos;

b) cutting a fragment of sequence (S2) that shows the mutual area common for all photos;

c) transforming the sequence into grayscale (SG1) while simultaneously saving the sequence in original colors;

d) determining the horizon line (L1);

e) determining a bitmap (B1); said bitmap comprising a difference between the intensity of pixels on two photos in the SG1 sequence for which the time of taking photos differs by at least 3 seconds;

f) applying a threshold filter for the B1 bitmap and determining a shut-off threshold that depends on specific pixels in relation to the horizon line to create a B2 bitmap;

g) applying an erosion filter on the B2 bitmap in order to remove noise and create a B3 bitmap;

h) removing all active pixels from the B3 bitmap for which the original color is taken from the S2 sequence is not a color from the greyscale and creating a B4 bitmap;

i) applying a dilatation filter on the B4 bitmap and creating a B5 bitmap;

j) determining common active pixel regions on the B5 bitmap with dimensions of at least 10×10 pixels;

k) rejecting regions for which the lower edge begins significantly above the horizon line;

l) creating a sub-sequence from remaining regions—e.g. sequences of photo cut-outs from the SG1 sequence;

m) transforming each frame of all sub-sequences infinitely (shifts and rotations), so that it will cover the same fragment of an observed area;

n) determining active pixels for each sub-sequence on the basis of a difference in pixel intensity of specific sub-sequence frames;

o) determining a source pixel for active pixels on the basis of a shift in relation to a previous frame in the sub-sequence;

p) determining an average shift of an object on a sub-sequence on the basis of source pixels;

q) rejecting sub-sequences for which the average object shift does not possess a positive vertical element;

r) creating a source pixel intensity bitmap for each sub-sequence;

s) removing all sub-sequences in which a mutual source point for active pixels is not found;

t) dividing each sub-sequence into a raster with dimensions of at least 3×3;

u) determining an average pixel shift for each raster cell;

v) creating an input data vector for multi-layered perceptron with full connection network on the basis of average shifts;

w) supplying the created input data vector to the perceptron entry and reading the result;

x) rejecting sub-sequences for which the perceptron output value has reached a value below 30% of the perceptron's output function range;

y) providing the S1 sequence to the entrance of deep neuron network and, upon exiting the B6 bitmap with a smoke occurrence, acquiring a probability distribution on a given pixel; and z) rejecting sub-sequences for which the smoke occurrence probability does not exceed at least 30% and treating the areas of remaining sub-sequences as areas where smoke occurs.

CONCLUSORY MATTERS

From the foregoing, it can be seen that the present invention accomplishes at least all of the stated objectives.

LIST OF REFERENCE NUMERALS

The following list of reference numerals is provided to facilitate an understanding and examination of the present disclosure and is not exhaustive. Provided it is possible to do so, elements identified by a numeral may be replaced or used in combination with any elements identified by a separate numeral. Additionally, numerals are not limited to the descriptors provided herein and include equivalent structures and other objects possessing the same function.

20 simple internet protocol camera
22 conventional lens
24 optical component
26 camera module
28 video audio codec
30 external device controller
32 computer processing unit (CPU)
34 flash memory
36 memory
38 network interface
40 improved internet protocol camera
42 wide-angle lens
44 microcomputer
46 GPS
48 compass
50 gyroscope, accelerometer, and/or magnetometer
52 light intensity sensor
54 data analysis in a cloud using an algorithm
56 artificial intelligence
58 web application
60 mobile application
62 private network
64 public network
66 compressed images (of photos)
68 FTP server
70 smoke detection server
72 potential smoke or fire related threats
74 the Internet
76 deep learning library/neural network
78 layers of neural network
80 web application interface
82 mobile application interface
84 photo with identified smoke or fire related threat
86 map
88 camera position
90 wildfire position The present disclosure is not to be limited to the particular embodiments described herein. The following claims set forth a number of the embodiments of the present disclosure with greater particularity.

What is claimed is:

1. A smoke detection system comprising:
a camera comprising:
an infrared camera module periodically taking photos of a landscape;
to determine a geographic position of objects identified within the landscape, (i) a GPS receiver and (ii) a gyroscope, a magnetometer, or an accelerometer;
a light intensity sensor;
an operable connection to the Internet; and
a processor that (i) downloads stored data which includes the photos through the operable connection to the Internet and (ii) executes an algorithm comparing characteristic values of the photos based on a pixel matrix that can identify pixels by color and a physical location within the photos;
artificial intelligence to compare results obtained from executing the algorithm with other data from an open-source software library, said artificial intelligence comprising:
a convolutional neural network capable of (i) collecting the photos and (ii) recognizing shapes, edges, and lines of the photos, said convolutional neural network further comprising:
an input layer containing information including a bitmap comprising a difference between the intensity of pixels on at least two of the photos;
an output layer containing information about a calculated probability of an occurrence of smoke on a particular pixel of the bitmap;
inner hidden layers that transform the information from the input layer into the information of the output layer, said internal layers including at least (i) a threshold filter for determining a shut-off threshold depending on the pixel matrix, (ii) an erosion filter to remove noise, and (iii) an additional filter selected from the group consisting of: (1) an infrared filter to identify fire and smoke related threats; and (2) a dilation filter;
a non-transitory computer readable medium capable of executing a software application allowing human users to verify potential smoke or fire related threats identified by the artificial intelligence by polling the human users in a community; and
a means for notifying a fire department, service, or brigade of verified smoke or fire related threats.

2. The smoke detection system of claim 1 wherein the camera is installed in an elevated area.

3. The smoke detection system of claim 1 wherein the camera is mounted on a drone.

4. The smoke detection system of claim 1 further comprising a File Transfer Protocol (FTP) server to control image capture.

5. The smoke detection system of claim 1 wherein the photos are compressed with a lossless compression into compressed images and further wherein the stored data comprises the photos.

6. The smoke detection system of claim 1 wherein the artificial intelligence references a deep learning library to continuously improve the ability to recognize smoke.

7. The smoke detection system of claim 1 wherein the means for notifying a fire department, service, or brigade is a notification forming part of a mobile application or a web application, an email, a short messaging service (SMS), or a multi-media messaging service (MMS).

8. The smoke detection system of claim 1 wherein the smoke or fire related threats are deemed verified if, after polling the human users, more human users indicate there is smoke or a fire than human users who do not indicate there is smoke or a fire, and further wherein a verified smoke or fire related threat results in the means for notifying a fire department, service, or brigade transmitting an alarm to the fire department, service, or brigade.

9. The smoke detection system of claim 8 wherein the alarm transmitted to the fire department, service, or brigade includes a photo of the verified smoke or fire related threat, a map with a calculated position of the camera from the GPS receiver, and statistics including how many and what percentage of human users verified the smoke or fire related threat.

10. The smoke detection system of claim 1 wherein the camera further comprises a wide-angle lens.

11. A method of detecting smoke or a fire comprising:
  installing a camera in an elevated area, the camera comprising:
    an infrared camera module periodically taking photos of a landscape;
    to determine a geographic position of objects identified within the landscape, (i) a GPS receiver and (ii) a gyroscope, a magnetometer, or an accelerometer;
    a light intensity sensor;
    an operable connection to the Internet; and
    a processor that (i) downloads stored data which includes the photos through the operable connection to the Internet and (ii) executes an algorithm comparing characteristic values of the photos based on a pixel matrix;
  with the processor, downloading stored data which includes the photos through the operable connection to the Internet;
  executing an algorithm comparing characteristic values of the photos based on a pixel matrix by:
    creating a source pixel intensity bitmap for sub-sequences corresponding to regions of the photos;
    removing all sub-sequences in which a mutual source point for active pixels is not found;
    dividing each sub-sequence into a raster cell with dimensions of at least 3×3;
    determining an average pixel shift for each raster cell;
    creating an input data vector for multi-layered perceptron with full connection network on the basis of average shifts;
    supplying the created input data vector to the perceptron entry and reading the result;
    rejecting sub-sequences for which the perceptron output value has reached a value below a threshold percentage of the perceptron's output function range;
    acquiring a probability distribution on a given pixel; and
    rejecting sub-sequences for which the smoke occurrence probability does not exceed at least the threshold percentage and treating the areas of remaining sub-sequences as areas where smoke occurs;
  with artificial intelligence, comparing results obtained from executing the algorithm with other data from an open-source software library; and
  verifying smoke or fire related threats identified by the artificial intelligence by polling human users in a community.

12. The method of claim 11 further comprising compressing the photos with a lossless compression into compressed images.

13. The method of claim 11 further comprising referencing a deep learning library to continuously improve the ability to recognize smoke.

14. The method of claim 11 further comprising reducing bandwidth required by the camera by transferring control of image capture from an FTP server to the camera.

15. The method of claim 11 further comprising notifying a fire department, service, or brigade of verified smoke or fire related threats via a mobile application or a web application, an email, a short messaging service (SMS), or a multi-media messaging service (MMS).

16. The method of claim 11, wherein the human users are polled with a non-transitory computer readable medium capable of executing a software application.

17. The method of claim 16 wherein verifying smokes or fire related threats occurs if, after polling the human users, more human users indicate there is smoke or a fire than human users who do not indicate there is smoke or a fire.

18. The method of claim 17 wherein notifying the fire department, service, or brigade includes sending a photo of the verified smoke or fire related threat, a map with a calculated position of the camera from the GPS receiver, and statistics including how many and what percentage of human users verified the smoke or fire related threat.

19. The method of claim 18 further comprising triangulating the location of smoke or a fire via the use of more than one camera.

20. A camera specially adapted for use in a smoke detection system comprising:
  a wide-angle lens;
  an infrared camera module periodically taking photos of a landscape;
  to determine a geographic position of objects identified within the landscape, (i) a GPS receiver and (ii) a gyroscope, a magnetometer, or an accelerometer;
  a light intensity sensor;
  an operable connection to the Internet; and
  a processor that (i) downloads stored data which includes the photos through the operable connection to the Internet and (ii) executes an algorithm comparing characteristic values of the photos based on a pixel matrix that identifies pixels by color and a physical location within the photos;
  wherein said algorithm is defined, at least in part, by use of (i) a threshold filter for determining a shut-off threshold depending on the pixel matrix, (ii) an erosion filter to remove noise, and (iii) an additional filter selected from the group consisting of: (1) an infrared filter to identify fire and smoke related threats; and (2) a dilation filter, and further, said algorithm being capable of:

creating a source pixel intensity bitmap for sub-sequences corresponding to regions of the photos;

removing all sub-sequences in which a mutual source point for active pixels is not found;

dividing each sub-sequence into a raster cell with dimensions of at least 3×3;

determining an average pixel shift for each raster cell;

creating an input data vector for multi-layered perceptron with full connection network on the basis of average shifts;

supplying the created input data vector to the perceptron entry and reading the result;

rejecting sub-sequences for which the perceptron output value has reached a value below a threshold percentage of the perceptron's output function range;

acquiring a probability distribution on a given pixel; and rejecting sub-sequences for which the smoke occurrence probability does not exceed at least the threshold percentage and treating the areas of remaining sub-sequences as areas where smoke occurs.

* * * * *